United States Patent
Fullerton

(10) Patent No.: US 6,360,173 B1
(45) Date of Patent: Mar. 19, 2002

(54) GEOPHYSICAL EXPLORATION SYSTEM AND METHOD

(75) Inventor: Larry W. Fullerton, Brownsboro, AL (US)

(73) Assignee: Terrescan Technologies, Inc., Carmel, CA (US)

( * ) Notice: Subject to any disclaimer, the term of this patent is extended or adjusted under 35 U.S.C. 154(b) by 0 days.

(21) Appl. No.: 09/505,636

(22) Filed: Feb. 16, 2000

Related U.S. Application Data

(60) Provisional application No. 60/121,008, filed on Feb. 22, 1999.

(51) Int. Cl.⁷ .................................................. G01V 1/28
(52) U.S. Cl. ............................................................ 702/14
(58) Field of Search .............................. 702/14, 16, 17, 702/18; 367/41, 42, 70, 74, 100, 23; 181/113, 108, 116, 117

(56) References Cited

U.S. PATENT DOCUMENTS

| | | |
|---|---|---|
| 4,164,036 A | 8/1979 | Wax |
| 4,376,301 A | 3/1983 | Roberts |
| 4,486,866 A | 12/1984 | Muir |
| 4,598,391 A | 7/1986 | Muir |
| 4,969,129 A | 11/1990 | Currie |
| 5,042,611 A | 8/1991 | Howlett |
| 5,790,475 A | 8/1998 | Marmarelis et al. |

*Primary Examiner*—Donald E. McElheny, Jr.
(74) *Attorney, Agent, or Firm*—McCutchen, Doyle, Brown & Emersen

(57) ABSTRACT

A system and method for detecting and profiling subsurface structures and/or properties. The system uses a time-coded, pulse-shaped detonation wave to impart energy to the ground. The detonation wave is a monocycle waveform. Echoes returned from geologic strata and features deep within the earth are captured and processed to localize and identify vital mineral resources such as oil or gas pockets, kimberlite pipes, salt or other concentrated mineral deposits. The system is portable and uses fuel that is both adaptable and inexpensive.

15 Claims, 2 Drawing Sheets

GEOPHYSICAL EXPLORATION SYSTEM AND METHOD

CROSS-REFERENCES TO RELATED APPLICATIONS

This application claims the benefit of priority under 35 U.S.C. §119 from U.S. Provisional Patent Application Ser. No. 60/121,008, filed on Feb. 22, 1999, the disclosure of which is hereby incorporated by reference as if set forth in full in this document.

BACKGROUND OF THE INVENTION

The present invention generally relates to the detection and profiling of subterranean geophysical structures and/or properties. More specifically, the present invention relates to a system and method for detecting and profiling subterranean geophysical structures and/or properties using sequences of coded pulses in a monocycle waveform.

Profiling of subterranean geophysical structures and/or properties is essential to the seismic survey industry. Seismic surveys are a primary exploration tool used to determine whether subsurface geologic conditions are favorable for finding accumulations of oil and gas. Conventional technologies used in seismic surveys generally rely on the introduction of acoustic shock waves deep into the subsurface of the earth and the detection of reflected waves at the surface.

Shock waves are introduced into the ground through the use of either explosives or a vibration coupler. The explosive method sends a broadband pulse into the ground and the resulting spatial echoes are collected by a large systematic grid field of seismic sensors, alternatively, known as geophones. Due to the inherent, dangerous nature of explosives, this method necessarily requires careful planning and a significant amount of setup time.

Apart from the time-consuming preparation, the explosive method has at least a number of operational shortcomings. First, in order to impart greater clarity in shadow zones, many different detonations must be performed. Further, the explosive process has the undesirable effect of producing nonlinear results. The detonation of explosives necessarily compresses the earth, thereby masking details which would otherwise be made visible. Therefore, it would be desirable to provide a system and method that requires less preparation and produces better results.

The second method of introducing shock waves into the ground uses a vibration coupler. The vibration coupler generally comprises a large hydraulic motor with an offset weight used to impart a vibration into the ground. Such vibration coupler generally has a time-varying structure that is usually proprietary to the company that manufactures the vibration coupler. Furthermore, a 5- or 10-ton truck is usually required to move the vibration coupler from site to site. Therefore, it would be desirable to provide a system and method that is convenient to transport from location to location.

SUMMARY OF THE INVENTION

The present invention relates to a system and method for detecting and profiling geophysical structures and/or properties. The system includes an impulsive seismic source, an echo detector for sensing data that are representative of the echoes returned by the geophysical structures and/or properties. The impulsive seismic source generates a sequence of coded pulses in a monocycle waveform. The sequence of coded pulses propagates to the geophysical structures and/or properties, causing them to return a number of echoes. These echoes are captured and processed to produce an image which is representative of the profiled geophysical structures and/or properties.

The present invention can be used in a variety of industries, especially, in the burgeoning market for the acquisition, processing and analysis of 3-dimensional and 4-dimensional seismic survey data in connection with locating, mapping and managing reservoirs of subsurface hydrocarbons. The present invention can also be employed to locate salt domes and other subsurface geologic strata that may contain petroleum or natural gas, kimberlite pipes (diamonds), magnetite and certain phosphates. It can further be employed to detect and locate underground aquifers, subterranean tunnels, caverns, fractures and faults. Furthermore, the present invention can also be applied to the detection of near-surface buried objects, such as underground storage tanks, utility pipes and mains, and for the neutralization of buried ordnace such as antipersonnel land mines.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings.

DESCRIPTION OF THE SPECIFIC EMBODIMENTS

Figure 1:
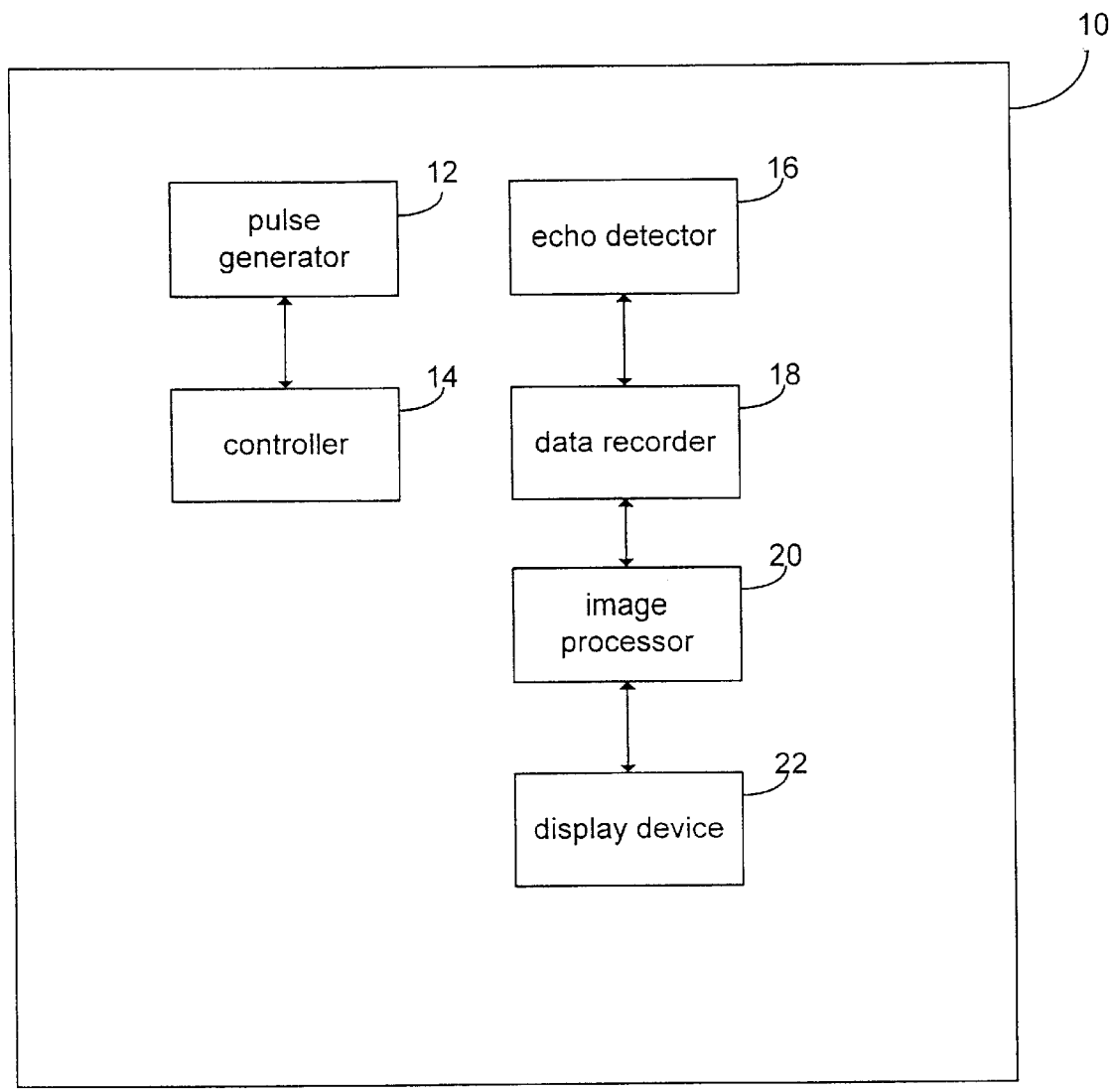
FIG. 1 is a block diagram showing the various elements of an embodiment of the present invention.

In one embodiment of the system in accordance with the present invention, as shown in FIG. 1, the system 10 includes an impulsive seismic source 12, a controller 14 for controlling the operation of the impulsive seismic source 12, an echo detector 16, a data recorder 18, an image processor 20, and a display device 22. It should be understood that while the foregoing elements of the system 10 are identified separately, these elements do not necessarily have to be physically separated. Some elements can be configured to reside on the same machine, for example, the controller 14, the data recorder 18, and the image processor 20 can all be parts of a single computer.

The impulsive seismic source 12 can be made up of a number of thrust drivers or pulse generators. These thrust drivers are light tubes that can be carried by personnel in a backpack or parachuted into a remote area inaccessible by typical transportation. The thrust drivers are used to transmit the power of a detonation wave to the ground. A thrust driver generates the detonation wave by controlling and directing the explosion of a flammable fuel.

Such detonation wave is delivered to the ground in a sequence of specially coded pulses. Each pulse in the pulse sequence is time coded and uses what is called a monocycle waveform. The monocycle waveform, in turn, is derived from a gaussian waveform. The generation of a monocycle waveform from a gaussian waveform is commonly known in the art.

A gaussian-derived waveform is preferred because such waveform has a long coherence path length, thereby ensuring that the gaussian nature is retained in return echoes. A further advantage of using a gaussian-derived waveform is that by using a coherent waveform, sources of extraneous noise can be canceled out. Since the original pulse and the return echo both contain gaussian characteristics, processing calculations are simplified and rendered more manageable. This Gaussian-derived waveform is the simplest waveform which combines the widest bandwidth wit the lowest center frequency. Thus it gives the greatest resolution with the lowest loss due to propagation through lossy media. The original pulse and the random noise associated with each return echo are subtracted from each return echo to produce a resulting signal. It can be shown that this resulting signal is a much clearer and better representation of the target geophysical structure and/or property. Techniques for generating, acquiring and processing monocycle signals are described in U.S. Pat. No. 5,832,035 by Fullerton, U.S. Pat. No. 5,687,169 by Fullerton and U.S. Pat. No. 5,677,927 by Fullerton, the disclosures of which are incorporated by reference, in their entirety, for all purposes.

As previously mentioned, the detonation wave is created by the controlled and directed explosion of a detonable gaseous fuel-air or fuel-oxygen mixture. Any of a number of flammable fuels can be used including methane, propane, hydrogen, butane, alcohol, acetylene, MAP gas, gasoline and aviation fuel. The use of such flammable fuels have significant advantages over solid and/or liquid explosives, since they are easily obtainable from various sources and are relatively low in cost.

Furthermore, the explosion of a flammable fuel produces more accurate results. Maximum energy is imparted to the ground per unit of time resulting in a clearer picture. The improved clarity is attributed to the reduction of non-linearity effects. Non-linearity effects are substantially reduced because the coded pulses do not compress the earth thereby producing mostly linear signals. In addition, a series of smaller explosions can be set off over a period of time to obtain any desired degree of resolution and any desired depth can be reached by extending the detection period.

The controller 14 is used to control the operation of the impulsive seismic source 12. The controller 14 can be a portable computer or workstation which is programmed to generate the desired time-coded pulse sequence upon which the propagation of the detonation waves is triggered.

The echo detector 16 can be made up of an array of sensors or geophones. This array of geophones constitutes a synthetic aperture array which is analogous to synthetic aperture array radar. This synthetic aperture array allows for the capture of highly focused, clear image data from the subsurface in multiple focal lengths and in real time without moving or modifying the array configuration. This allows data taken from an array of non-directional sensors to be focused at any point in the ground via post-processing. Such processing is the geophysical analogy to synthetic aperture array processing, meaning that the data from the individual geophones can be combined coherently to be the equivalent of a much larger focusable geophone. Using this synthetic aperture array, data collection is done with fewer geophones than both explosives and vibration couplers. Furthermore, the array of geophones can be distributed randomly and are not required to be arranged in a conventional grid array.

The data or echoes captured by the echo detector 16 are stored in the data recorder 18 for subsequent processing. Various types of storage devices commonly known in the art can be used as the data recorder 18. Similarly, conventional devices commonly known in the art can be used as the image processor 20 and the display device 22.

Figure 2:
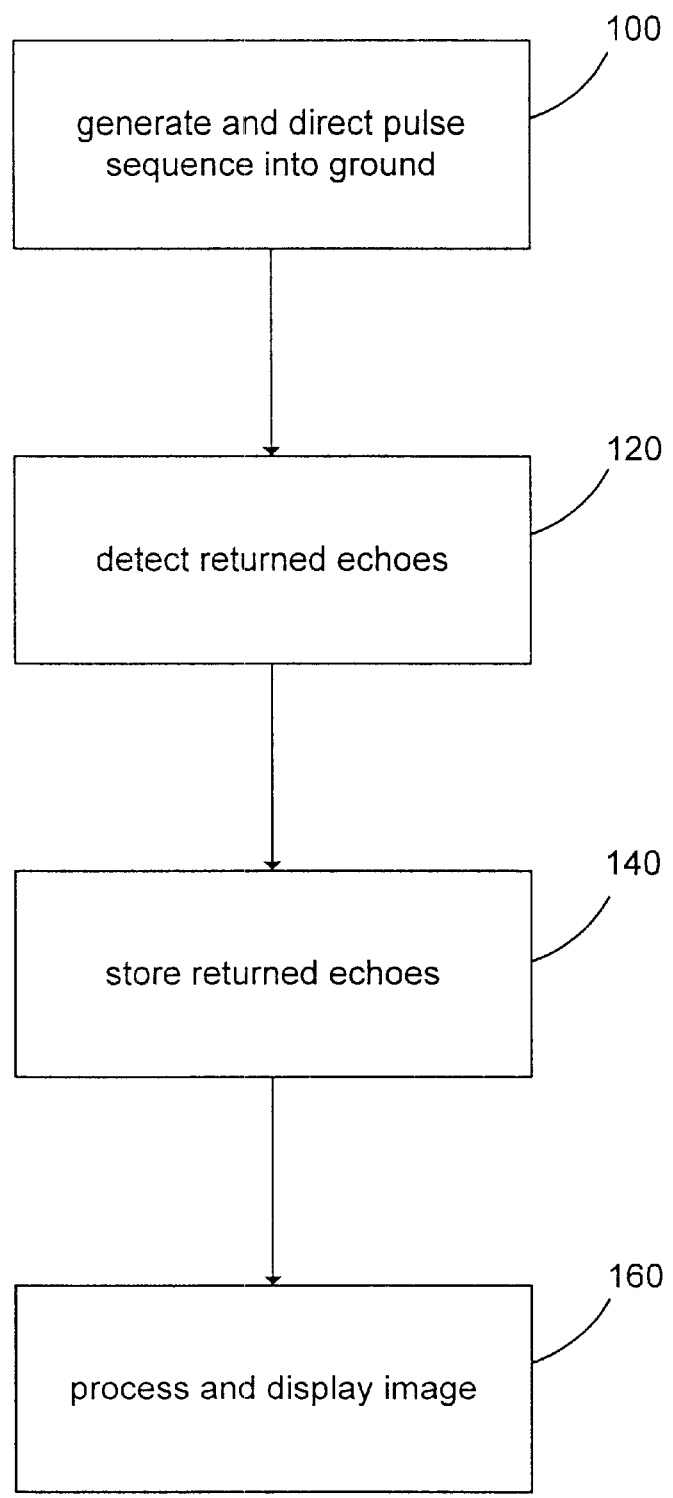
FIG. 2 is a flow diagram illustrating the logical steps taken during the operation of an embodiment in accordance with the present invention.

FIG. 2 illustrates the logical steps taken during the operation of the system 10 in accordance with the present invention. At step 100, a vibratory or impulsive seismic source 12 directs a sequence of coded pulses in a monocycle waveform into the subsurface where they are reflected and scattered by subsurface variations in physical properties.

At step 120, the echoes or waves returning to the surface are detected by the echo detector 16, i.e., the geophones. The geophones record the time histories of ground motion over a few seconds. The amplitudes, frequencies, and phases of these trace recordings are affected by various physical properties of the subsurface such as elastic constants, geometry, dimensions, inelasticity and anisotropy.

At step 140, the data recorder 18 stores the response of the earth as detected by the geophones. The data recorder 18 communicates with the geophones via an analog-to-digital converter and a multiplexer, and records and stores the data in one of several optional storage devices for subsequent processing and display.

At step 160, the recorded data can be processed by the image processor 20 in accordance with various well-known imaging algorithms and the results. can then be displayed through the display device 22.

The conventional presentation of seismic data is to plot a series of return amplitude vs. time waveforms on the vertical axis (a waveform plot). The "wiggles" are reflections due to inhomogenities of physical properties. The layout of the geophone array and the subsequent data processing to form an image from a synthetic aperture array is analogous to a synthetic aperture radar array. In analogy to optical lens systems, a fixed focal length antenna array would not remain in focus through the whole depth of field required if the system must image from near the surface to hundreds of feet below the surface. Thus, the antenna would need to be both large to cover a reasonable area of ground and also focusable in real time.

Since off axis reflections are received at successively greater delays at the antenna, they create a "point scatterer" which traces a curve in the resulting image. This curve is calculable, and can be removed in post processing. This allows data taken from an array of non-directional antennas to be focused at any point in the ground via post processing. Such processing is synthetic aperture array processing, meaning that the data from these individual antennas can be combined coherently to be the equivalent of a much larger focusable antenna.

The primary data wavefront curves are generated virtually in real time and can be interpreted by an experienced geophysicist. Spatial locations and 3-D imagery can be generated by using standard tomographic image processing. Higher resolution subsurface discrimination can be achieved through the combination of successive wavefront curves over time.

The system 10 has the capability to provide a quick look at the data in the field in real time. This capability can be useful to guide the direction of subsurface imaging efforts based on what is found in the field and ensure that the data taken to be analyzed are of sufficient fidelity and signal-to-noise ratio for maximum utility.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for detecting and profiling geophysical structures and/or properties, comprising:

an impulsive seismic source; and a sensing means for sensing data that are representative of a plurality of echoes returned by said geophysical structures and/or properties;

wherein said impulsive seismic source generates a coded sequence of time-coded pulses;

wherein said sequence of coded pulses propagates to said geophysical structures and/or properties, causing said geophysical structures and/or properties to return said plurality of echoes; and wherein each one of said sequence of coded pulses is a pulse in a monocycle waveform and is derived from a gaussian waveform.

2. A system according to claim 1, further comprising:

a means for storing said data for subsequent display or processing.

3. A system according to claim 2, further comprising:

a processing means for processing said data;

wherein said processing means uses one or more imaging algorithms to process said data; and wherein said processed data represent images of said geophysical structures and/or properties.

4. A system according to claim 3, further comprising:

a display means for displaying said processed data.

5. A system according to claim 1, wherein said sensing means is a plurality of seismic sensors.

6. A system according to claim 1, wherein said impulsive seismic source includes an array of pulse generators;

wherein said array of pulse generators is synchronized to generate said sequence of coded pulses in a predetermined direction.

7. A system for detecting and profiling geophysical structures and/or properties, comprising;

a pulse generator for generating a sequence of coded pulses in monocycle waveform derived from a gaussian waveform; and one or more sensors for capturing data that are representative of a plurality of signals echoing from said geophysical structures and/or properties in response to said sequence of coded pulses propagating to said geophysical structures and/or properties.

8. A system according to claim 7, further comprising:

a data recorder for storing said captured data;

a data processor for processing said captured data to produce images which are representative of said geophysical structures and/or properties; and a display for displaying said images.

9. A method for detecting and profiling geophysical structures and/or properties, comprising the steps of:

generating a sequence of coded pulses;

sensing data that are representative of a plurality of echoes returned by said geophysical structures and/or properties; and configuring an array of pulse generators to generate said sequence of coded pulses in a predetermined direction, wherein said sequence of coded pulses propagates to said geophysical structures and/or properties, causing said geophysical structures and/or properties to return said plurality of echoes; and wherein each one of said sequence of coded pulses is a pulse in a monocycle waveform.

10. A method according to claim 9, further comprising the steps of:

storing said data for subsequent display or processing;

processing said data using one or more imaging algorithms; and displaying said processed data.

11. A method according to claim 9, wherein said array of pulse generators can be configured in a randomly distributed manner.

12. A method according to claim 9, wherein said monocycle waveform is derived from a gaussian waveform.

13. A device for detecting and profiling geophysical structures and/or properties, comprising:

an array of impulsive seismic sources for generating a sequence of coded pulses in a predetermined direction; and an array of geophones for sensing data that are representative of a plurality of echoes returned by said geophysical structures and/or properties;

wherein said array of impulsive seismic sources generates a sequence of coded pulses;

wherein said sequence of coded pulses propagates to said geophysical structures and/or properties, causing said geophysical structures and/or properties to return said plurality of echoes; and wherein each one of said sequence of coded pulses is a pulse in a monocycle waveform.

14. An apparatus for detecting and profiling geophysical structures and/or properties, comprising:

a means for generating a sequence of coded pulses in a monocycle waveform;

a sensing means for sensing data that are representative of a plurality of echoes returned by said geophysical structures and/or properties in response to said sequence of coded pulses propagating to said geophysical structures and/or properties;

a storage means for storing said data for subsequent display or processing;

a processing means for processing said data using one or more imaging algorithms so as to produce a profile of said geophysical structures and/or properties; and a display means for displaying said profile.

15. A method for detecting and profiling geophysical structures and/or properties, comprising the steps of:

generating a sequence of coded pulses in monocycle waveform;

sensing data that are representative of a plurality of echoes returned by said geophysical structures and/or properties in response to said sequence of coded pulses propagating to said geophysical structures and/or properties;

storing said data for subsequent display or processing;

processing said data using one or more imaging algorithms so as to produce a profile of said geophysical structures and/or properties; and displaying said profile.

* * * * *